May 18, 1926.
J. R. VINSANT
BRICK MOLDING MACHINE
Filed July 24, 1925
1,585,576
4 Sheets-Sheet 1
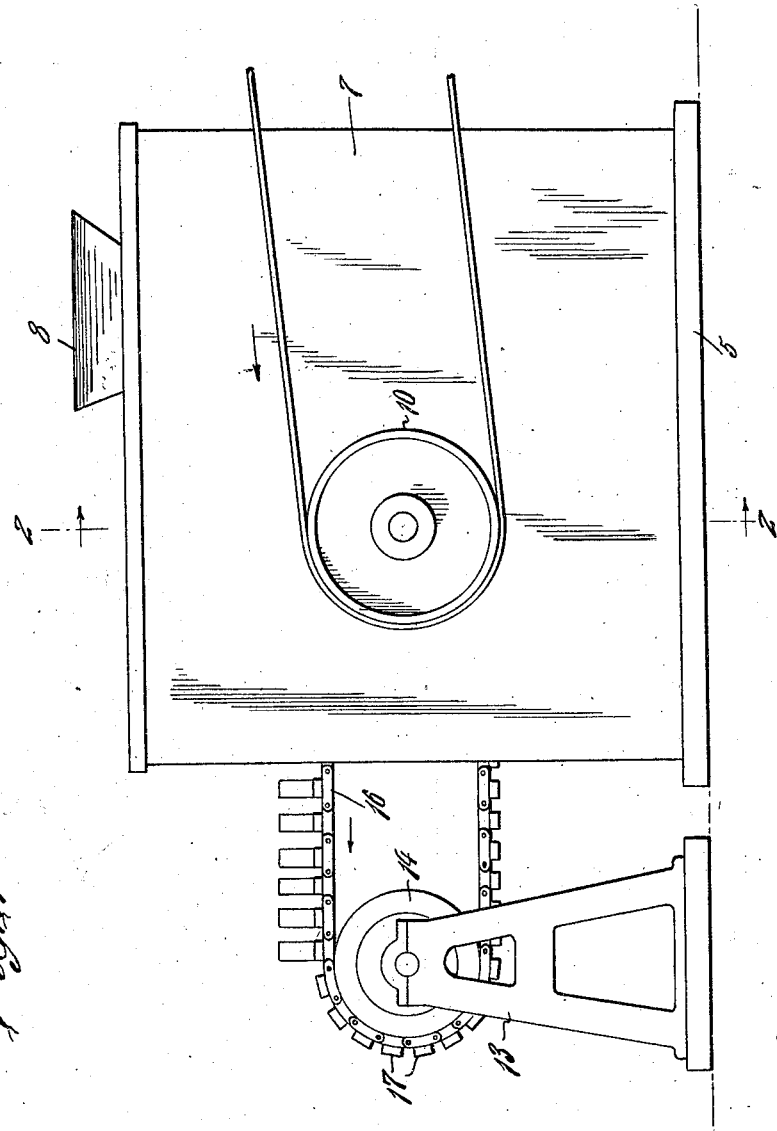

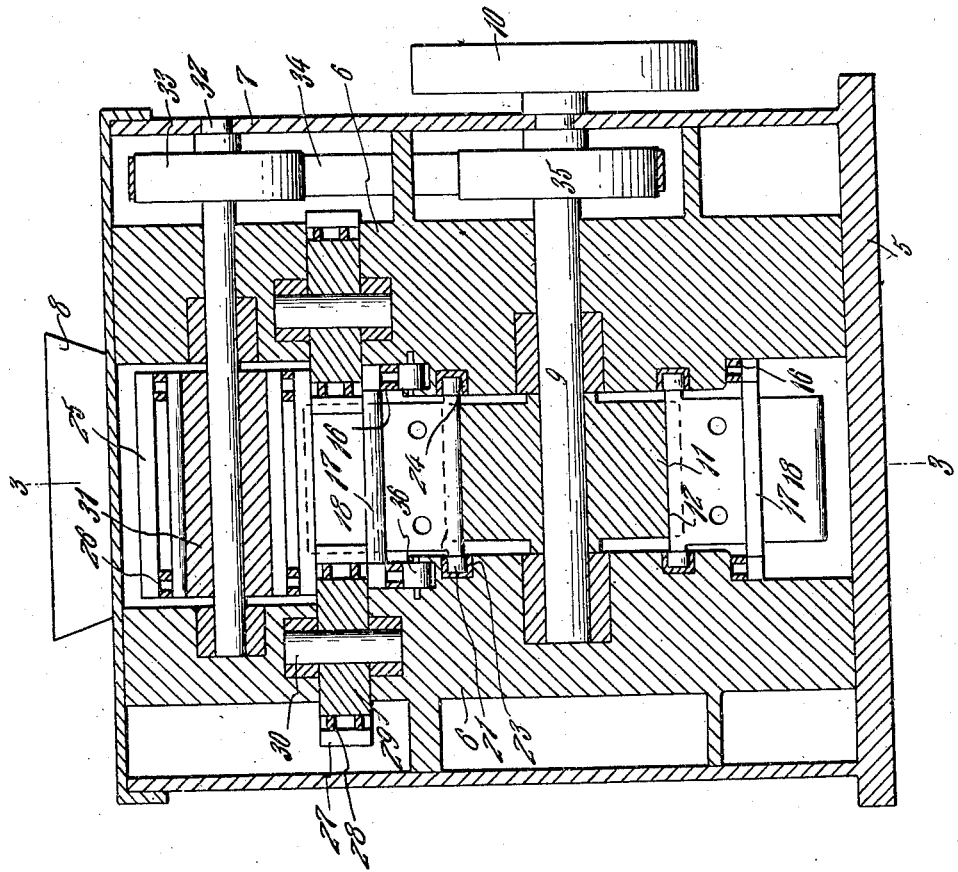

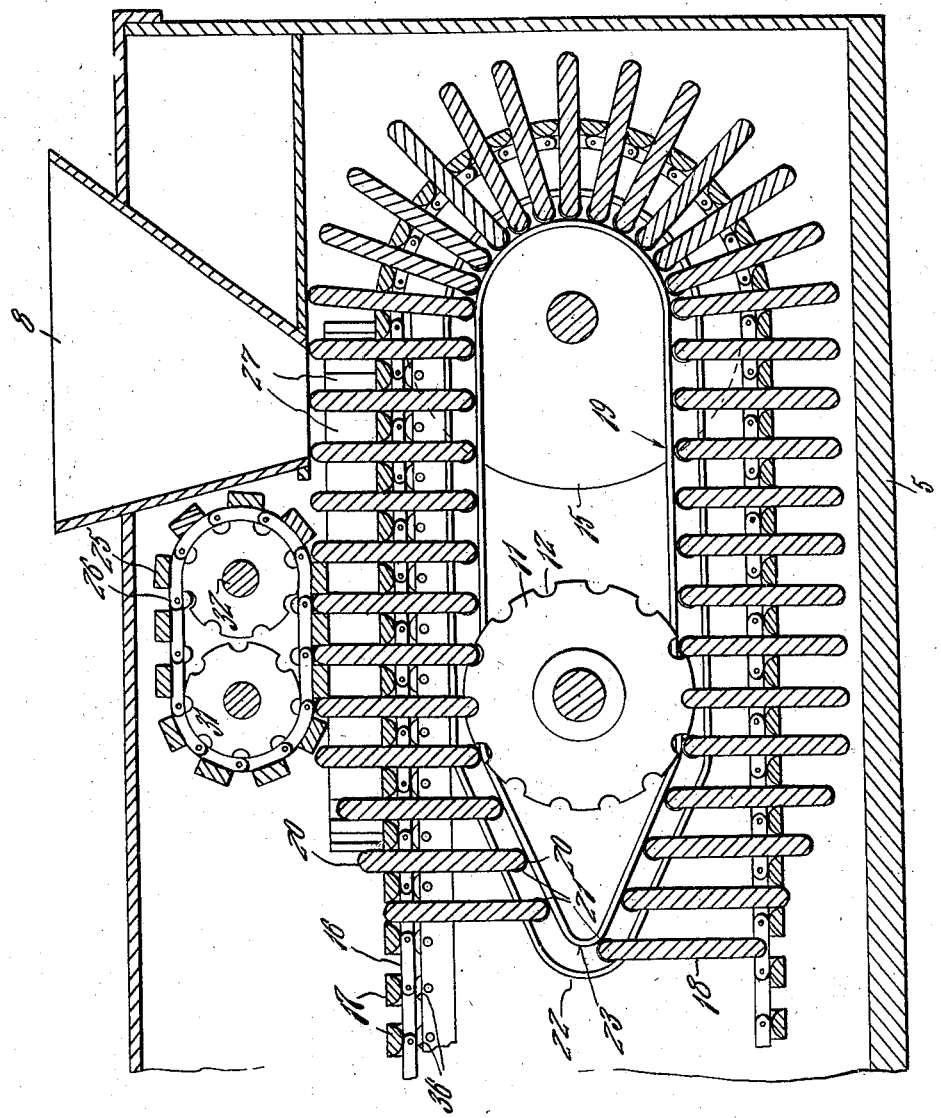

May 18, 1926.
J. R. VINSANT
1,585,576
BRICK MOLDING MACHINE
Filed July 24, 1925
4 Sheets-Sheet 4
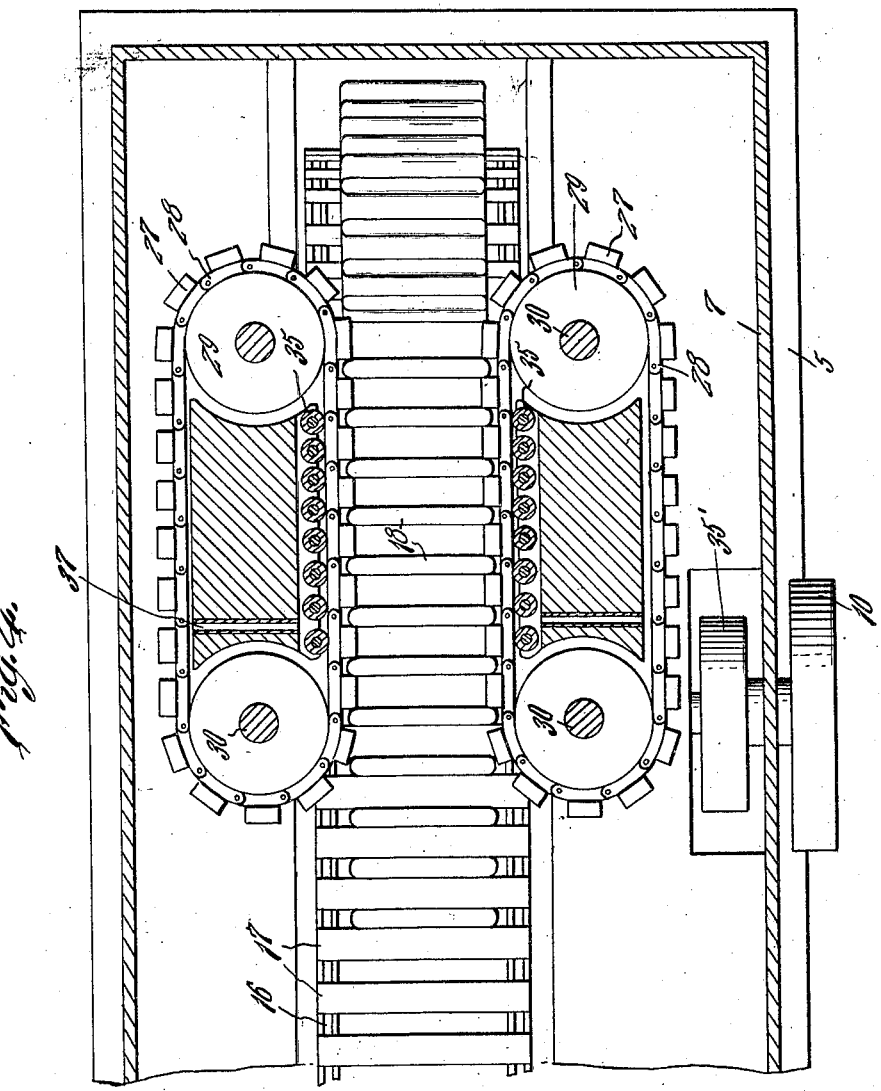

Patented May 18, 1926.

1,585,576

UNITED STATES PATENT OFFICE.

JOHN R. VINSANT, OF LAKELAND, FLORIDA.

BRICK-MOLDING MACHINE.

Application filed July 24, 1925. Serial No. 45,911.

This invention contemplates the provision of molding machines and is primarily adapted for the molding of bricks.

The essential feature of the invention resides in providing a machine for the molding of bricks continuously during the operation of the machine, and one which is simple, inexpensive and efficient.

Another object resides in the provision of a device of the above stated character so constructed as to simplify and improve the construction of molds of the character above stated and also of the compression of the brick pressing means and the mold forming plates co-operating therewith.

With these and other ends in view, which will readily appear as the nature of the invention is better understood, the same consists in the improved construction and novel arrangement and combination of parts which will be hereinafter fully described and particularly pointed out in the claims.

In the accompanying drawings has been illustrated a simple and preferred embodiment of the invention, it being, however, understood that no limitation is necessarily made to the precise structural details therein exhibited, but that changes, alterations and modifications within the scope of the claims may be resorted to when desired.

In the drawings:

Figure 1 is a side elevation of the brick molding machine set up for use.

Figure 2 is a section taken on line 2—2 of Figure 1.

Figure 3 is a section taken on the line 3—3 of Figure 2, and

Figure 4 is a horizontal sectional view.

Referring more particularly to the accompanying drawings wherein like characters denote corresponding parts, the brick molding machine forming the subject matter of the present invention embodies a base 5 and rising from adjacent each side thereof are spaced supporting blocks 6. Mounted upon the base 5 adjacent its outer edge is a casing 7 provided with a hopper 8 rising from its top wall and facilitating the feeding of the brick material into the machine for molding the material into bricks.

Journaled through one wall of the casing 7 and traversing the supports 6 in suitable bearings is the main drive shaft 9 to which is imparted movement by a convenient source of power supply (not shown) through the medium of a pulley 10. A main drive wheel 11 provided with longitudinally disposed grooves 12 in its outer surface is secured to the main drive shaft 9 in a manner to rotate between the supporting blocks 6 as clearly shown in Figure 2 of the drawings.

Arranged adjacent the front of the casing 7 is bearing brackets 13 which rotatably supports a wheel 14 and trained about the wheel 14 and the wheel 15 which is rotatably mounted in the casing and having bearings in the supporting blocks 6 is an endless mold feeding chain 16. By this construction it will be obvious that as the brick forming material is fed in the hopper 8 the same will in turn be deposited upon transverse bed plates 17 carried by the mold feeding chains 16. However, for retaining the brick forming material upon the bed plates 17 and to assure of the molding of the material into brick formation, the use is made of a plurality of mold forming plates 18.

For properly associating the mold forming plates 18 with the machine to effect the automatic traversing of such mold forming plates during the operation of the mold feeding chain, a pair of endless tracks 19 are arranged within the casing and in spaced vertical relation with one another and disposed longitudinally within the inner walls of the supporting blocks 6. Each of the mold forming plates is of substantially rectangular shape in formation and provided with rounded upper and lower transverse edges, designated at 20, and the plates are installed in the tracks for a combined slidable and pivotal movement by the provision of rollers 21 secured at the lower side edges of these plates as shown in Figure 2 of the drawings. The ends 22 of each track is of substantial V-formation to represent inclines 23 and 24, the purpose of which will be brought out as the description of the machine is proceeded with.

Owing to the specific configuration of each of the molding plates 18, the mounting of the plates in their tracks for a combined slidable and pivotal connection therewith, as the mold feeding chain is propelled by the plates 18 having their lower ends engaged in the groove 12 of the drive wheel 11, the mold forming plates will automatically slide down the inclines 23 and 24 of the V-shaped ends 22 of the track and from between the links and bed plates 17 of the mold feeding chain. When the mold forming plates in their movement are brought into alignment with the hopper 8, by the engagement of the grooved wheel therewith and movement of the mold feeding chain, such mold forming plates will assume a vertical upright position and in spaced parallelism with one another so by the time the plates between which has been deposited a suitable quantity of brick forming material leaves the discharge end of the hopper 8, the brick forming material is ready to be compressed in the manner as will now be described.

The brick forming material is automatically compressed between the filled mold forming plates and upon the bed plates 17 of the mold feeding chains by the provision of spaced pressing blocks 25 disposed upon endless chains 26 arranged above and longitudinally of the mold feeding chain 16 and also by the employment of lateral blocks 27 carried by chains 28 trained over idle sprockets 29 having their shafts 30 disposed within the supports 6 in a manner whereby the chains 28 are substantially horizontal parallel with the mold forming plates and to the opposite sides of the mold feeding chains as shown in Figure 2 of the drawings. Motion is transmitted to the chains 28 by the blocks 27 thereof being engaged between the mold forming plates 18 as shown in Figure 4. The blocks 27 being arranged on their chains 28 to accomplish this purpose and the blocks 25 of the chains 26 aid the grooved wheel 11 for operating the mold forming plates 18, the blocks not only press the upper surface of the brick forming material but engage the plates 18 at their upper ends and in a manner to cooperate with the main drive wheel 11. The chains 26 are trained about sprockets 31 having shafts 32 transversing the support 6. One of said shafts 32 passes through one of the supports 6 and its outer end has secured thereto a pulley 33 which receives the upper run of a belt 34 trained about a pulley 35' disposed on the main drive shaft 9 from which the pulley carried shaft 33 derives its power.

For suitably guiding the respective block carrying chains 28 and during the compressing operation of the blocks 27 on the brick forming material between the mold forming plates, and further for successfully moving the block carrying chains 28, there is provided a plurality of vertically spaced rollers 35 each being journaled in the supports 6 for engaging the innermost run of the chains as shown in Figure 4 of the drawings.

It will be observed that the said molding forming plates drop by gravity from engagement with the blocks 25 and 27 of the chains 26 and 28 and also cause the displacement of the blocks from between the links and bed plates of the mold feeding chain. After the mold feeding plates 18 travel down the inclined portions 23 and 24 of the track, they interengage with the mold feeding chains as shown in Figure 3 of the drawings and are retained in such engagement until after the molding operation of the brick forming material has been accomplished. It will be obvious that in view of the fact that the grooved wheel 11 engages the lower end of the mold forming plates and the blocks 25 the upper ends thereof during the pressing operation, that the plates will be retained in true vertical position until they begin their downward journey of the upper portion of the inclined portion of the tracks.

To prevent the sagging of the mold feeding chains while the molds are being filled and while the contents thereof are being compressed, the mold feeding chains engage a plurality of horizontally arranged rollers 36 mounted for rotation in the inner side walls of the supports 6 as suggested in Figure 2 of the drawing.

For the purpose of oiling the rollers 35 there is provided oiling passages 37 which are formed through portions of the supporting blocks 6 as shown in Figure 4.

From the foregoing it will be apparent that the brick making machine which forms the subject matter of the present invention is extremely simple with very few working parts to complete finished bricks in an extremely short time from the passage of the brick forming material from the hoppe. 8 to the compressing apparatus to the finished bricks which are carried from casing 7 by the endless mold feeding chain 16 and as suggested in Figure 1 of the drawings.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A mold forming machine of the character described comprising a base, spaced supports rising therefrom, an endless mold feeding chain mounted for travel between said supports, bed plates carried thereby, a casing housing said spaced supports, a hopper extending through said casing for disposing brick material upon the bed plates, a plurality of mold forming plates associated with and adapted to move said mold feeding chain in its operation and means for compressing the side and top of said brick material when received on said bed plates and between the respective mold forming plates.

2. A brick molding machine of the character described comprising a base, spaced supports rising therefrom, a drive shaft journaled in said supports and disposed therebetween, a grooved wheel on said shaft, a casing arranged about said supports, a mold feeding chain passing between said supports, a series of bed plates carried by the mold feeding chains, a plurality of chains associated with the mold feeding chain and being operated in unison therewith, a series of blocks secured to each of the plurality of chains, a series of mold forming plates loosely associated in said tracks and automatically engaging between certain of the links of the mold feeding chain, said mold feeding plates being of sufficient width and length to protrude between the blocks of the plurality of chains in a manner whereby the blocks are adapted to compress the material between the mold forming plates and upon the bed plates of the mold feeding chain which is operated by the grooved wheel, and the blocks of one of said plurality of chains respectively, and a hopper passing through the casing for introducing brick material to the bed plates and between the mold forming plates.

3. A brick molding machine of the character described comprising a base, a casing rising therefrom, a pair of supporting blocks arranged on the base, a shaft passing through the casing and finding bearings in the supporting blocks, a grooved wheel carried by the shaft and rotated thereby, a bearing bracket arranged adjacent said casing, a wheel rotatably mounted in bearings carried thereby, a wheel rotatably mounted in the supporting blocks in parallelism with the drive shaft, a mold feeding chain trained over the respective last mentioned wheels, a series of equi-spaced bed plates carried by the mold feeding chain, a pair of parallel arranged tracks disposed in the inner side walls of the supporting blocks, a series of mold forming plates having one of their ends received in the tracks for movement therein, and being adapted to interengage the mold feeding chains between the bed plates thereon when arranged in a portion of the tracks, and pressing blocks disposed above the mold feeding chain and to each side thereof for cooperation with the mold forming plates.

4. A brick molding machine of the character described comprising a base, a pair of supporting blocks rising therefrom, a casing housing said supporting blocks, a hopper extending through the upper wall of said casing for introducing brick forming material therein, a mold feeding chain trained through said casing, bed plates included in said mold feeding chain and carried thereby, horizontally parallel arranged rollers disposed in the inner side walls of the supporting blocks and being adapted to prevent sagging of the mold feeding chain in its movement, a pair of parallel arranged tracks secured in the inner side walls of the supporting blocks, a series of mold forming plates, rollers secured laterally to one end of said mold forming plates and being disposed in the tracks for movement therein, a main drive wheel having longitudinal grooves formed thereon and being adapted to receive one of the ends of the mold forming plates for the movement thereof in their tracks, said mold forming plates automatically engaging between certain of the links of the mold feeding chain and bed plates thereof and being supported by said bed plates and links in vertical spaced parallel relation with each other for receiving therewith a quantity of brick material, means for pressing the brick material upon each side of said mold forming plates and at the upper portion thereof, and said mold forming plates being of sufficient width and length to protrude between the bed plates and together with said last mentioned means and bed plates forms the brick molds.

5. A brick molding machine of the character described comprising a base, a pair of spaced parallel supports rising therefrom, tracks arranged in the inner side walls of said supports and having inclined portions disposed at one of the ends thereof, a casing housing said supports, a mold feeding chain mounted for travel through said casing, a plurality of mold forming plates mounted for movement in the tracks and being of sufficient in width and length to protrude between the links of the mold feeding chain, said mold forming plates being mounted in said tracks for a slidable pivotal movement and automatically engaging between certain of the bed plates of the mold feeding chain, pressing blocks disposed upon the opposite sides of the mold forming plates, a shaft transversing the supporting blocks adjacent the upper ends thereof, a second shaft arranged in parallelism therewith, sprockets secured to said shafts, chains trained about said sprockets, blocks carried by said chains, and cooperating with said means and the mold forming plates, bed plates carried by the mold feeding chain, and being operatively associated with said blocks, and means including said blocks for moving the mold forming plates in their tracks as described.

In testimony whereof I affix my signature.

JOHN R. VINSANT.